Sept. 14, 1926.
T. RUSSELL
SPROCKET CHAIN
Filed Feb. 21, 1925
1,600,016
Fig. 1.
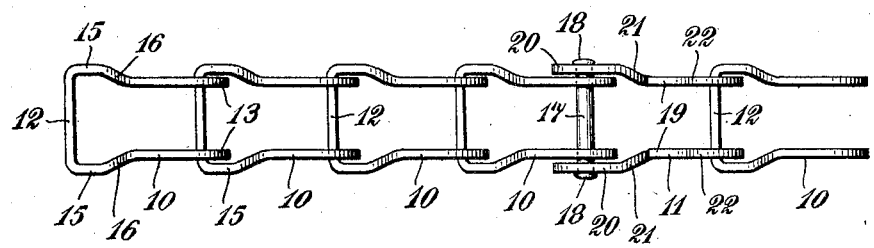
Fig. 2.
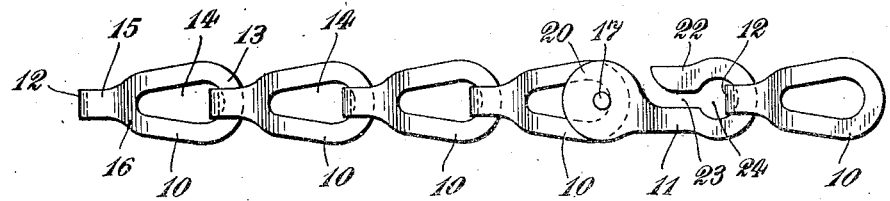
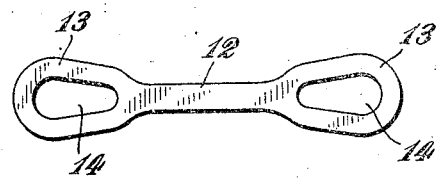
Fig. 3.
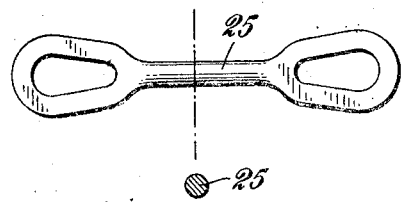
Fig. 4.
INVENTOR
*Theodore Russell*
BY
ATTORNEY Patented Sept. 14, 1926.

1,600,016

UNITED STATES PATENT OFFICE.

THEODORE RUSSELL, OF NAUGATUCK, CONNECTICUT.

SPROCKET CHAIN.

Application filed February 21, 1925. Serial No. 10,769.

This invention relates to chains, and more particularly to a sprocket chain having sheet metal links.

One object of this invention is to provide a sprocket chain of the above nature composed of one-piece U-shaped links, the sides of said links being spaced apart and being parallel with each other.

A further object is to provide a sprocket chain of the above nature having a special form of link for detachably connecting the ends of the chain.

A further object is to provide a device of the above nature in which the links are rigid in construction and in which the chain will not be likely to lengthen or twist in use.

A further object is to provide a device of this nature which will be simple in construction, inexpensive to manufacture, strong and light in construction, and very efficient and durable in use.

With these and other objects in view, there have been illustrated on the accompany drawings, two forms in which the invention may be conveniently embodied in practice.

Fig. 1 represents a top view of a section of sprocket chain composed of links constructed in accordance with the first form of the invention.

Fig. 2 is a side view of the same.

Fig. 3 is a top view of one of the flat blanks from which the links of the sprocket chain are formed.

Fig. 4 is a similar view of a modified form of blank, also embodying the invention.

Referring now to the drawings in which like reference numerals denote corresponding parts throughout the several views, the chain shown in Figs. 1 and 2 is composed of a series of main links 10 of identical construction, the end links of said chain being joined by a special form of connecting link 11.

In the manufacture of the main links 10, a flat blank is first stamped out of sheet metal into the form illustrated in Fig. 3, said blank comprising a narrow central base portion or "bridge" 12 and a pair of enlarged oval apertured arms 15, having eyes 14 formed therein.

In order to form the main links, the blanks are bent up into substantially U-shaped form, as shown in Fig. 1, the arms of said links being disposed at right angles to the base portions 12 thereof. The free extremities 13 of said arms 15 are offset inwardly from the planes of the other ends of said arms so that when the links are assembled in a chain, the eyes 14 of one link will surround the narrow base portions 12 of the next adjoining link, and the arms 15 of the first link will lie under the arms of said adjoining link, allowing the links to swing freely over one another. The extremities 13 of the arms 15 are connected to the other ends thereof by converging inclined sections 16, as clearly shown in Fig. 1.

The special form of connecting link for joining the end links of the chain comprises a cross rod 17, having headed extremities 18 and a pair of side arms 19 rigidly mounted on said cross rod 17. The side arms 19 are provided with rear circular sections 20, connected by converging inclined sections 21 to forward hook sections 22.

The hook sections 22 are provided with horizontal passageways 23 leading to circular eyes 24 which are adapted to encircle the base section 12 of the adjacent main link 10.

As will be evident, the connecting link 11 is adapted to be permanently joined by means of its cross rod 17 to one of the end main links and detachably joined by the hook sections 22 to the other end main link.

In operation, when it is desired to detachably join the connecting link 11 with the free main link of the chain, it will only be necessary to twist the connecting link 11 downwardly to a vertical position, as viewed in Fig. 2, until the passageways 23 are parallel with the base 12 of said main link 10, the latter link meanwhile being held horizontal. The base 12 of the free main link 10 may then be moved through the passageways 23 until it reaches the bottom of the eyes 24, after which the connecting link 11 may be twisted back about the cross rod 17 into horizontal position in alinement with the remaining links of the chain.

In the modified form of the invention shown in Fig. 4 the blank link differs from that illustrated in Fig. 3 by having its central bridge 25 rounded in cross section. The modified form of blank is preferably made by placing the blank shown in Fig. 3 in dies and rounding its bridge 25 by the use of pressure. The originally rectangular bridge 25 will thus be swaged into the shape shown in Fig. 4, after which the link will be completed by bending it into U-shape.

One advantage of the modified form of link is that when used in a chain the friction will be reduced to the minimum and wear at the bridge portion 25 will be diminished. Consequently, with this type of link, a chain will not be liable to lengthen and become loose even after a long period of use.

While the modified form of link is preferably constructed from the blank shown in Fig. 3, it will be understood that it may also be formed, if desired, from a piece of round metal wire by flattening and perforating the ends thereof, and then bending it into U-shape.

While there have been disclosed in this specification two forms in which the invention may be embodied, it is to be understood that these forms are shown for the purpose of illustration only, and that the invention is not to be limited to the specific disclosures but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a sprocket chain link, a base member adapted to lie transversely to the length of a chain, and a pair of longitudinal side eye sections arranged parallel to each other, said eye sections being adapted to enclose the base member of the next link of said chain, said link being formed from a strip of flat metal bent into substantially U-shape, said link having substantial rectangular corners whereby spaces will be left to fit over the teeth of a sprocket wheel.

2. In a sprocket chain link, a base member adapted to lie tranversely to the length of a chain, and a pair of longitudinal side eye sections arranged parallel to each other, said eye sections being joined to said base member by a pair of converging inclined sections and being adapted to enclose the base member of the next link of said chain, said link being formed from a strip of flat metal bent into substantially U-shape.

3. In a sprocket chain, a plurality of connected U-shaped links, the side arms of each of said links being parallel and spaced apart and being apertured in their ends to receive the base of the adjoining link, said links being made from strip metal rectangular in cross section, the side arms of adjacent links lying substantially in alinement.

4. In a sprocket chain, a plurality of connected U-shaped links, the side arms of each of said links being parallel and spaced apart and being apertured in their ends to receive the base of the adjoining link, the apertured ends of said arms being offset inwardly from the remainder of said arms so as to permit said links to pivot freely upon each other.

5. In a sprocket chain, a plurality of connected U-shaped links formed from strip metal of rectangular cross section, and comprising a base and a pair of side arms, the side arms of each link being parallel and spaced apart and having apertures in their ends to receive the base of the adjoining link, the base of each link having a rounded edge so as to minimize friction and prevent rapid wearing and consequent lengthening of said chain.

In testimony whereof, I have affixed my signature to this specification.

THEODORE RUSSELL.